(12) United States Patent
Argue et al.

(10) Patent No.: US 9,092,818 B2
(45) Date of Patent: Jul. 28, 2015

(54) METHOD AND SYSTEM FOR ANSWERING A QUERY FROM A CONSUMER IN A RETAIL STORE

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 13/756,205

(22) Filed: Jan. 31, 2013

(65) Prior Publication Data

US 2014/0214605 A1 Jul. 31, 2014

(51) Int. Cl.
G06Q 30/06 (2012.01)
G06Q 30/00 (2012.01)

(52) U.S. Cl.
CPC ............ *G06Q 30/0639* (2013.01); *G06Q 30/00* (2013.01)

(58) Field of Classification Search
None
See application file for complete search history.

(56) References Cited

U.S. PATENT DOCUMENTS

| 5,886,698 | A | 3/1999 | Sciammarella | |
|---|---|---|---|---|
| 6,121,969 | A | 9/2000 | Jain | |
| 6,381,583 | B1 | 4/2002 | Kenney | |
| 7,873,911 | B2 | 1/2011 | Gopalakrishnan | |
| 8,260,685 | B2 * | 9/2012 | Fuxman et al. | 705/26.7 |
| 8,264,505 | B2 | 9/2012 | Bathiche | |
| 8,355,961 | B1 * | 1/2013 | Ng et al. | 705/28 |
| 8,682,879 | B2 | 3/2014 | Kim | |
| 2001/0047270 | A1 * | 11/2001 | Gusick et al. | 705/1 |
| 2004/0181461 | A1 * | 9/2004 | Raiyani et al. | 705/26 |
| 2006/0010046 | A1 * | 1/2006 | Van Zandt | 705/26 |
| 2006/0047704 | A1 | 3/2006 | Gopalakrishnan | |
| 2006/0190340 | A1 * | 8/2006 | Myskowski | 705/26 |
| 2009/0228264 | A1 * | 9/2009 | Williams et al. | 704/9 |

(Continued)

FOREIGN PATENT DOCUMENTS

| EP | 1755067 A1 | 2/2007 |
|---|---|---|
| WO | WO2013023705 A1 | 2/2013 |
| WO | WO2014035367 A1 | 3/2014 |

OTHER PUBLICATIONS

Swartz, J., "Shopping Will Never Be the Same", USA Today, Aug. 9, 2012, ISSN 07347456.*

*Primary Examiner* — Courtney Stopp
*Assistant Examiner* — Brittany Bargeon
(74) *Attorney, Agent, or Firm* — Howard & Howard Attorneys PLLC (57) ABSTRACT

A computer-implemented method is disclosed herein. The method includes the step of receiving, with a processing device of a commerce server, a signal from a consumer transmitted through an augmented reality device worn by the consumer. The method also includes the step of confirming, with the processing device, the signal contains a query from the consumer. The method also includes the step of retrieving, with the processing device, a proposed answer to the query. The method also includes the step of transmitting, with the processing device, the proposed answer to the augmented reality device. The method also includes the step of verifying, with the processing device, the proposed answer is accepted by the consumer. The method also includes the step of prompting, with the processing device, the consumer to resubmit the signal if the query is not confirmed in the confirming step or if the proposed answer is not accepted in the verifying step.

16 Claims, 4 Drawing Sheets

(56) References Cited

U.S. PATENT DOCUMENTS

| | | |
|---|---|---|
| 2010/0185529 A1 | 7/2010 | Chesnut |
| 2010/0324961 A1* | 12/2010 | Singh et al. ............ 705/8 |
| 2011/0131084 A1* | 6/2011 | Shanahan ............ 705/14.4 |
| 2011/0141254 A1 | 6/2011 | Roebke |
| 2012/0062596 A1 | 3/2012 | Bedi |
| 2012/0089470 A1* | 4/2012 | Barnes, Jr. ............ 705/16 |
| 2012/0256917 A1 | 10/2012 | Lieberman |
| 2012/0259732 A1* | 10/2012 | Sasankan et al. ............ 705/26.9 |
| 2012/0306850 A1* | 12/2012 | Balan et al. ............ 345/419 |
| 2013/0066551 A1* | 3/2013 | Bednar et al. ............ 701/526 |
| 2013/0127980 A1* | 5/2013 | Haddick et al. ............ 348/14.08 |
| 2013/0135344 A1 | 5/2013 | Stirbu |
| 2013/0147837 A1 | 6/2013 | Stroila |
| 2013/0170697 A1 | 7/2013 | Zises |
| 2014/0100994 A1 | 4/2014 | Tatzel |
| 2014/0139551 A1 | 5/2014 | McCulloch |

* cited by examiner

METHOD AND SYSTEM FOR ANSWERING A QUERY FROM A CONSUMER IN A RETAIL STORE

BACKGROUND INFORMATION

1. Field of the Disclosure

The present invention relates generally to answering queries from consumers. In particular, consumer queries transmitted through an augmented reality can be received and processed with a server, wherein answers can be communicated to consumers through the augmented reality device.

2. Background

Some retail stores extend across tens of thousands of square feet and offer thousands of products for sale. Many consumers visit such retail stores when shopping for products such as groceries, office supplies, and household wares. Typically, these stores can have dozens of aisles and/or sections. Accordingly, traversing these aisles looking for specific products may be a frustrating experience. Furthermore, overcrowding can occur in certain regions of the retail location. Employees of the retail store can be deployed to overcrowded locations, leaving consumers in other areas of the retail store without assistance. Difficulties in finding products and minimal available assistance at a retail location can be frustrating to customers and tends to discourage customers from shopping at the retail store.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist a consumer shopping in a retail store. A consumer assistance system can receive one or more queries that can be transmitted from an augmented reality device worn by a consumer. The consumer assistance system can attempt to resolve a consumer's query with one or more proposed answers. The consumer assistance system can also determine the consumer's satisfaction with the one or more proposed answers. If the consumer assistance system determines that the consumer does not believe that the query has been satisfactorily answered, the consumer assistance system can divert the consumer's query to human customer service.

In some embodiments of the present disclosure, a signal from a consumer can be transmitted through an augmented reality device worn by the consumer. The augmented reality device, such as a head mountable unit for example, can transmit one or more signals containing data as the consumer shops. The one or more signals can be received at a processing device of a commerce server.

The signal can be processed by the processing device to confirm that the signal contains a query from the consumer. The signal can include audio data, such as the consumer's voice asking a question. The query can be a navigational query, such as a request for directions to a particular product or department within the retail store. The query can be a request for information about a product. The query can be a request for information about the retail store. The query can be a request for current promotions, sales, or coupons associated with one or more products.

A proposed answer to the query can be retrieved and transmitted to the consumer. The proposed answer can be data retrieved from a product database. The product database can contain the identities of products in the retail store and the locations of each of the products within the retail store. Other databases can be included in embodiments of the present disclosure, each database containing data relevant to the kinds of queries that can be received from consumers.

A consumer assistance system can also verify that the proposed answer transmitted to the consumer is accepted by the consumer. The consumer can be prompted to resubmit the signal containing the query if the query is not initially confirmed or if the proposed answer is not accepted. The consumer can be prompted to rephrase the query in a second signal that is to be transmitted to the commerce server. The consumer assistance system can thus repeat the step of confirming that the signal contains a recognized query, the step of retrieving information if the proposed answer is not accepted, or both. The consumer assistance system can repeat various steps as often as is desirable. In some embodiments, it may be desirable that the consumer assistance system repeat one or more steps once so that the consumer can be quickly placed in contact with human customer service. If the query is not resolved, because the query cannot be discerned or because an acceptable answer cannot be retrieved, the consumer assistance system can divert the signal containing the query to human customer service. The consumer assistance system can place the consumer in direct communication with the human customer service. The human consumer service, communicating with the consumer through a computing device, can assist the consumer by providing an answer to the query.

Figure 1:
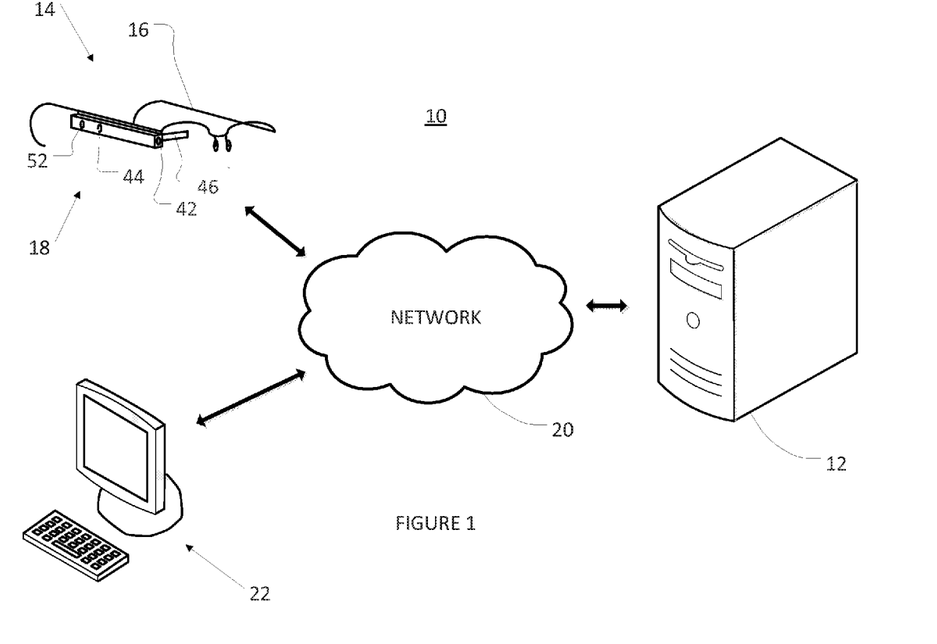
FIG. 1 is an example schematic illustrating a system according to some embodiments of the present disclosure.

FIG. 1 is a schematic illustrating a consumer assistance system 10 according to some embodiments of the present disclosure. The consumer assistance system 10 can implement a computer-implemented method that includes the step of receiving, with a commerce server 12, a signal from a consumer transmitted through an augmented reality device worn by the consumer. The signal can be received from an augmented reality device such as a head mountable unit 14. The head mountable unit 14 can be worn by a consumer while the consumer is shopping within a retail store. In the illustrated embodiment of FIG. 1, the exemplary head mountable unit 14 includes a frame 16 and a communications unit 18 supported on the frame 16.

The signal transmitted from the head mountable unit 14 can contain a query from the consumer. The query can be any kind of query that may arise for a consumer shopping in a retail store. For example, the query can be a navigation query in which the consumer asks the commerce server to advise where a particular product can be found in the retail store or for directions to a product or department within the retail store.

One or more signals can be transmitted by the head mountable unit 14 and received by the commerce server 12. The one or more signals can be transmitted through a network 20. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

The consumer assistance system 10 can retrieve and transmit an answer to the consumer in response to a query. The answer can be communicated as a signal containing audio data, video data, textual data, graphical data, or any combination thereof. The answer can be communicated to the consumer through the head mountable unit 14. The consumer assistance system 10 can also verify that the proposed answer transmitted to the consumer is accepted by the consumer.

If the commerce server 12 cannot ascertain a query in the one or more signals received from the head mountable unit, the commerce server 12 can prompt the consumer to transmit another signal. For example, the commerce server 12 can send an audio message or textual message asking that the consumer rephrase a statement/question that had been sent previously. The consumer assistance system 10 can thus repeat the step of receiving a signal and confirming that the signal contains a recognizable query if necessary to resolve a consumer's query. The commerce server 12 can repeat various steps as often as desired. In some embodiments of the present disclosure, the commerce server 12 can attempt to identify a query in a signal twice before diverting the signal to human customer service, represented by a computing device 22.

The human customer service can receive the signal from the commerce server 12 that had been received previously from the head mountable unit 14. The consumer assistance system 10 can place the consumer in direct communication with the human customer service. The human consumer service, communicating with the consumer through the computing device 22, can assist the consumer by providing an answer to the query. The commerce server 12 can also divert the consumer to human customer service if the answer transmitted to the consumer is not accepted by the consumer.

Figure 2:
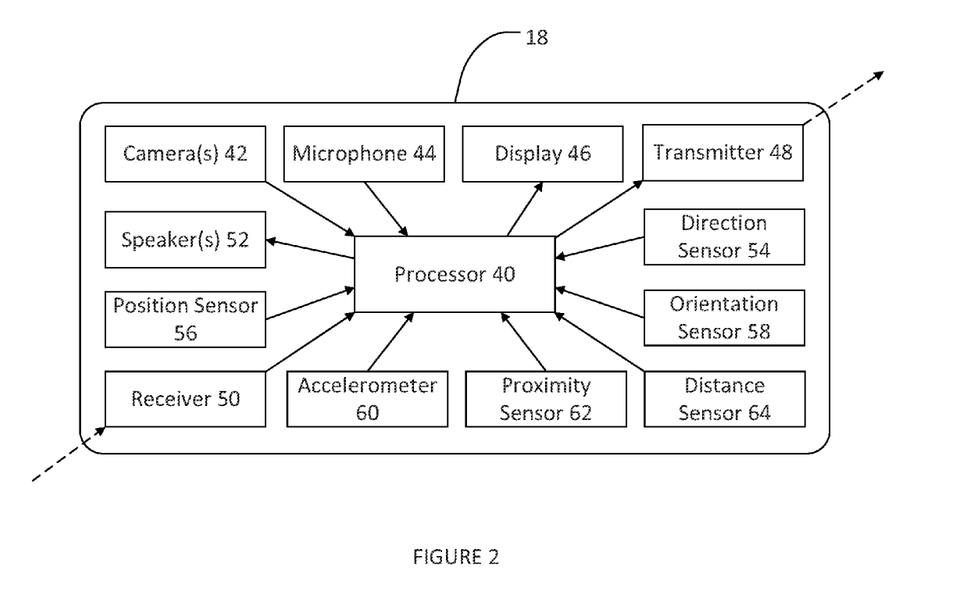
FIG. 2 is an example block diagram illustrating an augmented reality device unit that can be applied in some embodiments of the present disclosure.

FIG. 2 is a block diagram illustrating exemplary components of the communications unit 18. The communications unit 18 can include a processor 40, one or more cameras 42, a microphone 44, a display 46, a transmitter 48, a receiver 50, one or more speakers 52, a direction sensor 54, a position sensor 56, an orientation sensor 58, an accelerometer 60, a proximity sensor 62, and a distance sensor 64.

The processor 40 can be operable to receive signals generated by the other components of the communications unit 18. The processor 40 can also be operable to control the other components of the communications unit 18. The processor 40 can also be operable to process signals received by the head mount unit 14. While one processor 40 is illustrated, it should be appreciated that the term "processor" can include two or more processors that operate in an individual or distributed manner.

The head mount unit 14 can include one or more cameras 42. Each camera 42 can be configured to generate a video signal. One of the cameras 42 can be oriented to generate a video signal that approximates the field of view of the consumer wearing the head mountable unit 14. Each camera 42 can be operable to capture single images and/or video and to generate a video signal based thereon. The video signal may be representative of the field of view of the consumer wearing the head mountable unit 14.

In some embodiments of the disclosure, cameras 42 may be a plurality of forward-facing cameras 42. The cameras 42 can be a stereo camera with two or more lenses with a separate image sensor or film frame for each lens. This arrangement allows the camera to simulate human binocular vision and thus capture three-dimensional images. This process is known as stereo photography. The cameras 42 can be configured to execute computer stereo vision in which three-dimensional information is extracted from digital images. In such embodiments, the orientation of the cameras 42 can be known and the respective video signals can be processed to triangulate an object with both video signals. This processing can be applied to determine the distance that the consumer is spaced from the object. Determining the distance that the consumer is spaced from the object can be executed by the processor 40 or by the commerce server 12 using known distance calculation techniques.

Processing of the one or more, forward-facing video signals can also be applied to determine the identity of the object. Determining the identity of the object, such as the identity of a product in the retail store, can be executed by the processor 40 or by the commerce server 12. If the processing is executed by the commerce server 12, the processor 40 can modify the video signals limit the transmission of data back to the commerce server 12. For example, the video signal can be parsed and one or more image files can be transmitted to the commerce server 12 instead of a live video feed. Further, the video can be modified from color to black and white to further reduce transmission load and/or ease the burden of processing for either the processor 40 or the commerce server 12. Also, the video can cropped to an area of interest to reduce the transmission of data to the commerce server 12.

In some embodiments of the present disclosure, the cameras 42 can include one or more inwardly-facing camera 42 directed toward the consumer's eyes. A video signal revealing the consumer's eyes can be processed using eye tracking techniques to determine the direction that the consumer is viewing. In one example, a video signal from an inwardly-facing camera can be correlated with one or more forward-facing video signals to determine the object the consumer is viewing.

The microphone 44 can be configured to generate an audio signal that corresponds to sound generated by and/or proximate to the consumer. The audio signal can be processed by the processor 40 or by the commerce server 12. For example, verbal signals can be processed by the commerce server 12 such as "this product appears interesting." Such audio signals can be correlated to the video recording.

The display 46 can be positioned within the consumer's field of view. Video content can be shown to the consumer with the display 46. The display 52 can be configured to display text, graphics, images, illustrations and any other video signals to the consumer. The display 46 can be transparent when not in use and partially transparent when in use to minimize the obstruction of the consumer's field of view through the display 46.

The transmitter 48 can be configured to transmit signals generated by the other components of the communications unit 18 from the head mountable unit 14. The processor 40 can direct signals generated by components of the communications unit 18 to the commerce sever 12 through the transmitter 48. The transmitter 48 can be an electrical communication element within the processor 40. In one example, the processor 40 is operable to direct the video and audio signals to the transmitter 40 and the transmitter 48 is operable to transmit the video signal and/or audio signal from the head mountable unit 14, such as to the commerce server 12 through the network 20.

The receiver 50 can be configured to receive signals and direct signals that are received to the processor 40 for further processing. The receiver 50 can be operable to receive transmissions from the network 20 and then communicate the transmissions to the processor 40. The receiver 50 can be an electrical communication element within the processor 40. In some embodiments of the present disclosure, the receiver 50 and the transmitter 48 can be an integral unit.

The transmitter 48 and receiver 50 can communicate over a Wi-Fi network, allowing the head mountable device 14 to exchange data wirelessly (using radio waves) over a computer network, including high-speed Internet connections. The transmitter 48 and receiver 50 can also apply Bluetooth® standards for exchanging data over short distances by using short-wavelength radio transmissions, and thus creating personal area network (PAN). The transmitter 48 and receiver 50 can also apply 3G or 4G, which is defined by the International Mobile Telecommunications-2000 (IMT-2000) specifications promulgated by the International Telecommunication Union.

The head mountable unit 14 can include one or more speakers 52. Each speaker 52 can be configured to emit sounds, messages, information, and any other audio signal to the consumer. The speaker 52 can be positioned within the consumer's range of hearing. Audio content transmitted by the commerce server 12 can be played for the consumer through the speaker 52. The receiver 50 can receive the audio signal from the commerce server 12 and direct the audio signal to the processor 40. The processor 40 can then control the speaker 52 to emit the audio content.

The direction sensor 54 can be configured to generate a direction signal that is indicative of the direction that the consumer is facing. The direction signal can be processed by the processor 40 or by the commerce server 12. For example, the direction sensor 54 can electrically communicate the direction signal containing direction data to the processor 40 and the processor 40 can control the transmitter 48 to transmit the direction signal to the commerce server 12 through the network 20. By way of example and not limitation, the direction signal can be useful in determining the identity of a product(s) visible in the video signal, as well as the location of the consumer within the retail store.

The direction sensor 54 can include a compass or another structure for deriving direction data. For example, the direction sensor 54 can include one or more Hall effect sensors. A Hall effect sensor is a transducer that varies its output voltage in response to a magnetic field. For example, the sensor operates as an analog transducer, directly returning a voltage. With a known magnetic field, its distance from the Hall plate can be determined. Using a group of sensors disposing about a periphery of a rotatable magnetic needle, the relative position of one end of the needle about the periphery can be deduced. It is noted that Hall effect sensors can be applied in other sensors of the head mountable unit 14.

The position sensor 56 can be configured to generate a position signal indicative of the position of the consumer within the retail store. The position sensor 56 can be configured to detect an absolute or relative position of the consumer wearing the head mountable unit 14. The position sensor 56 can electrically communicate a position signal containing position data to the processor 40 and the processor 40 can control the transmitter 48 to transmit the position signal to the commerce server 12 through the network 20.

Identifying the position of the consumer can be accomplished by radio, ultrasound or ultrasonic, infrared, or any combination thereof. The position sensor 56 can be a component of a real-time locating system (RTLS), which is used to identify the location of objects and people in real time within a building such as a retail store. The position sensor 56 can include a tag that communicates with fixed reference points in the retail store. The fixed reference points can receive wireless signals from the position sensor 56. The position signal can be processed to assist in determining one or more products that are proximate to the consumer and are visible in the video signal.

The orientation sensor 58 can be configured to generate an orientation signal indicative of the orientation of the consumer's head, such as the extent to which the consumer is looking downward, upward, or parallel to the ground. A gyroscope can be a component of the orientation sensor 58. The orientation sensor 58 can generate the orientation signal in response to the orientation that is detected and communicate the orientation signal to the processor 40. The orientation of the consumer's head can indicate whether the consumer is viewing a lower shelf, an upper shelf, or a middle shelf.

The accelerometer 60 can be configured to generate an acceleration signal indicative of the motion of the consumer. The acceleration signal can be processed to assist in determining if the consumer has slowed or stopped, tending to indicate that the consumer is evaluating one or more products for purchase. The accelerometer 60 can be a sensor that is operable to detect the motion of the consumer wearing the head mountable unit 14. The accelerometer 60 can generate a signal based on the movement that is detected and communicate the signal to the processor 40. The motion that is detected can be the acceleration of the consumer and the processor 40 can derive the velocity of the consumer from the acceleration. Alternatively, the commerce server 12 can process the acceleration signal to derive the velocity and acceleration of the consumer in the retail store.

The proximity sensor 62 can be operable to detect the presence of nearby objects without any physical contact. The proximity sensor 62 can apply an electromagnetic field or a beam of electromagnetic radiation such infrared and assess changes in the field or in the return signal. Alternatively, the proximity sensor 62 can apply capacitive photoelectric principles or induction. The proximity sensor 62 can generate a proximity signal and communicate the proximity signal to the processor 40. The proximity sensor 62 can be useful in determining when a consumer has grasped and is inspecting a product.

The distance sensor 64 can be operable to detect a distance between an object and the head mountable unit 14. The distance sensor 64 can generate a distance signal and communicate the signal to the processor 40. The distance sensor 64 can apply a laser to determine distance. The direction of the laser can be aligned with the direction that the consumer is facing. The distance signal can be useful in determining the distance to an object in the video signal generated by one of the cameras 42, which can be useful in determining the consumer's location in the retail store.

Figure 3:
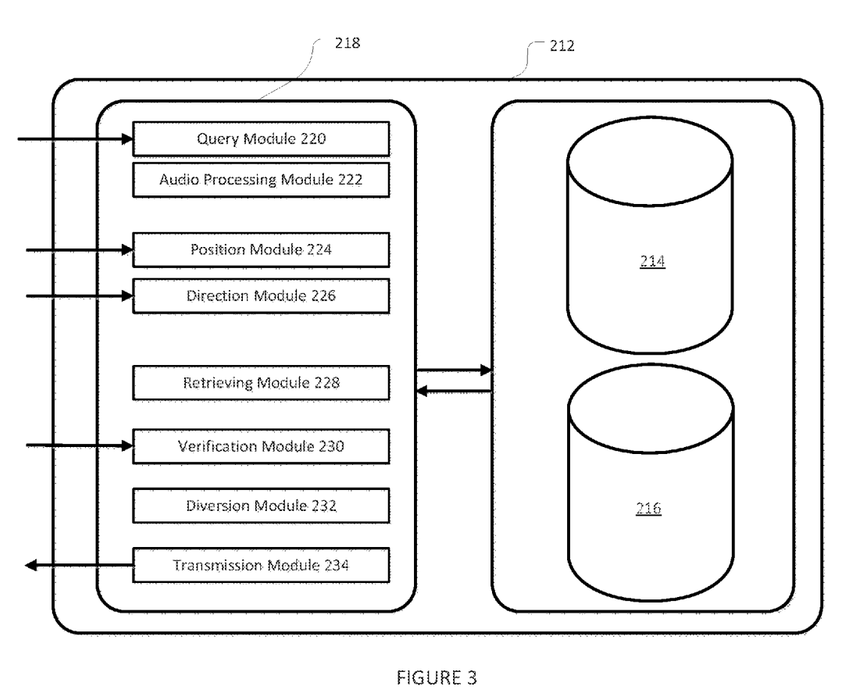
FIG. 3 is an example block diagram illustration a commerce server that can be applied in some embodiments of the present disclosure.

FIG. 3 is a block diagram illustrating a commerce server 212 according to some embodiments of the present disclosure. In the illustrated embodiment, the commerce server 212 can include a product database 214, and a consumer status database 216. The commerce server 212 can also include a processing device 218 configured to include a query module 220, an audio processing module 222, a position module 224, a direction module 226, a retrieving module 228, a verification module 230, a diversion module 232, and a transmission module 234.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The product database 214 can include in memory the identities of a plurality of products. The plurality of products can be the products offered for sale in a retail store associated with the commerce server 212. The product database 214 can also contain a floor plan of the retail store, including the location of each of the plurality of products within the retail store. The data in the product database 214 can be organized based on one or more tables that may utilize one or more algorithms and/or indexes.

The consumer status database 216 can include in memory the current status of consumers that have submitted signals to the commerce server 212. The status of each consumer who is associated with an "open" or unanswered query can be stored in the memory of the consumer status database 216. The status of a consumer can be defined by more than one category of data. The status of a consumer can be partially defined by the signal(s) received from the consumer. For example, in some embodiments of the present disclosure, the status of a consumer can be defined by the signal received from the consumer that contains a query, the consumer's position within the retail store, and the direction the consumer is facing. The position and direction data can be utilized in some embodiments of the present disclosure to provide directions to the consumer for locating a particular product in the retail store. The consumer status database 216 can contain in memory the signals received from consumers and each signal can be correlated to a particular consumer. The data in the consumer status database 216 can be organized based on one or more tables that may utilize one or more algorithms and/or indexes.

The processing device 218 can communicate with the databases 214, 216 and receive one or more signals from the head mountable unit 14. The processing device 218 can include computer readable memory storing computer readable instructions and one or more processors executing the computer readable instructions.

The query module 220 can receive a signal from a consumer transmitted through an augmented reality device worn by the consumer, such as the head mountable unit 14. When a query is received from a consumer, certain metadata can be included in the signal containing the query, in at least some embodiments of the present disclosure. This metadata can help with the processing and can include data that identifies the retail store from a plurality of different stores. The query module 220 can confirm that the signal received from the consumer contains a query. The query module 220 can function cooperatively with the audio processing module 222 to confirm that the signal contains a query from the consumer. The microphone 44 of the head mountable unit 14 can receive audio signals, such as the voice of the consumer, that can then be transmitted to the processing device 218.

The audio processing module 222 can implement known speech recognition techniques to identify speech in the audio signal, such as a words or comments that indicate that the consumer seeks assistance. The consumer's speech can be encoded into a compact digital form that preserves its information. The encoding can occur at the head mountable unit 14 or at the commerce server 212. The commerce server 212 can be loaded with a series of models honed to comprehend language. When encoded locally, the speech can be evaluated locally, on the head mountable unit 14. A recognizer installed on the head mountable unit 14 can communicate with the commerce server 212 to gauge whether the voice contains a command can be best handled locally or if the commerce server is better suited to execute the command. The commerce server 212 can compare the consumer's speech against a statistical model to estimate, based on the sounds spoken and the order in which the sounds were spoken, what letters might be contained in the speech. At the same time, the local recognizer can compare the speech to an abridged version of that statistical model applied by the commerce server 212. For both the commerce server 212 and the head mountable unit 14, the highest-probability estimates are accepted as the letters contained in the consumer's speech. Based on these estimations, the consumer's speech, now embodied as a series of vowels and consonants, is then run through a language model, which estimates the words of the speech. Given a sufficient level of confidence, the commerce server 212 can then create a candidate list of interpretations for what the sequence of words in your speech might mean. If there is enough confidence in this result, the commerce server 212 can determine the consumer's intent. For example, the consumer can state "where is the milk?" The audio processing module 222 can identify the words in the consumer's speech, such as "where" and "milk." The identification of these words can be the basis for confirming that the signal received from the head mountable unit 14 contains a query. The voice of the consumer can be continuously monitored as the consumer shops in some embodiments of the present disclosure.

The processing device 218 can receive a plurality of signals from the consumer, including the signal containing the query and also a position signal and a direction signal. In some embodiments, the processing device 218 can also include a position module 224. The position module 224 can receive the position signal from the head mountable unit 14. The position signal can be generated by the position sensor 56 and contain data corresponding to a location of the head mountable unit 14 in the retail store. The position of the consumer can be a factor applied if directions are to be provided to the consumer. The position of the consumer can be stored in the consumer status database 216 and be continually updated as the consumer moves within the retail store.

In some embodiments, the processing device 218 can also include a direction module 226. The direction module 226 can receive the direction signal from the direction sensor 54 of the head mountable unit 14. The direction signal can be generated by the direction sensor 54 and contain data corresponding to a direction of the head mountable unit 14 in the retail store. The direction of the consumer can be a factor applied if directions are to be provided to the consumer. The direction that the consumer is facing can be stored in the consumer status database 216 and be continually updated as the consumer moves within the retail store.

The retrieving module 228 can retrieve a proposed answer to the query. For example, in response to the detected words "where" and "milk," the retrieving unit 228 can access the product database 214 and retrieve the location of milk within the retail store. The retrieving module 228 can also access the consumer status database 216 and thereby access the consumer's position and direction. In response to the consumer's position and direction, the retrieving module 228 can derive directions that the consumer can follow to reach the location of milk within the retail store.

The transmission module 234 can function cooperatively with the retrieving module 228. The transmission module 234 can receive the proposed answer from the retrieving module 228, such as directions derived by the retrieving module 228, and transmit a signal containing the proposed answer to the head mountable unit 14. The signal transmitted to the head mountable unit 14 can contain the proposed answer in audio format. For example, the signal can contain an electronic audio file played on the speaker(s) 52 of the head mountable unit. The audio file played on the speaker(s) 52 of the head mountable unit can include audible directions emitted as the consumer moves through the retail store. For example, the consumer can be advised to proceed in a particular direction, at an intersection of aisles be advised to turn in a particular direction, and can be advised to turn in a particular direction within an aisle.

In some embodiments of the present disclosure, the signal transmitted to the head mountable unit 14 can contain the proposed answer in video format. The signal can contain an electronic video file displayed on the display 46 of the head mountable unit. The video file can include text directions sequentially displayed as the consumer moves through the retail store or can be a graphical symbol maintained on the display 46 for the consumer to follow. For example, the consumer can be advised with text messages appearing on the display 46 to proceed in a particular direction, at an intersection of aisles be advised to turn in a particular direction, and can be advised to turn in a particular direction within an aisle. Alternatively, a graphical symbol such as an arrow or a triangle can be displayed on the display 46 in the direction of interest; the consumer can move in the direction of the graphical symbol until the arrival of the location of interest.

The proposed answer can also be provided to the consumer in more than one stage. In a first stage the commerce server 212 can identify the nature of the proposed answer and in a second stage the commerce server 212 can identify the details of the proposed answer. The verification module 230 can functionally cooperate with the transmission module 234 and the retrieving module 228 to assess a response from the consumer to the first stage of the proposed answer. For example, a first stage of the proposed answer can be "are you looking for the location of milk" and can be conveyed to the consumer as an audio or video message. The verification module 230 can also functionally cooperate with the audio processing module 222. The audio processing module 222 can implement known speech recognition techniques to identify speech in the audio signal, such as a words or comments in reply to the first stage of the proposed answer in which the consumer indicates acceptance of the proposed answer. For example, the consumer can reply "yes" in response to the exemplary first stage; this reply can be received with the microphone 44 of the head mountable unit 14 and transmitted to the commerce server 212.

If the proposed answer is not accepted by the consumer, the verification module 230 can prompt the consumer to resubmit the signal. The query module 220 can also prompt the consumer to resubmit the signal if a query is not identified in a signal. The diversion module 232 can monitor the number of repetitions in which a consumer is prompted to resubmit a signal and the number of repetitions in which an answer is proposed to a consumer. The diversion module 232 can divert the consumer to a human customer service if the number of repetitions exceeds a predetermined number. In some embodiments of the present disclosure, the consumer can be prompted once to resubmit a signal in order to identify a query before the diversion module 232 diverts the consumer to human customer service. In some embodiments of the present disclosure, a consumer can be diverted to human customer service after two proposed and unaccepted answers have been transmitted.

The processing of the query from the consumer may be done automatically using an artificial intelligence computer system capable of answering questions posted in natural language. If it can't be handled by such a system with a desired level of confidence, the query can be directed to a human. An example of such an artificial intelligence system is IBM's Watson.

It is noted that the various processing functions set forth above can be executed differently than described above in order to enhance the efficiency of an embodiment of the present disclosure in a particular operating environment. The processor 40 can assume a greater role in processing some of the signals in some embodiments of the present disclosure. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 4:
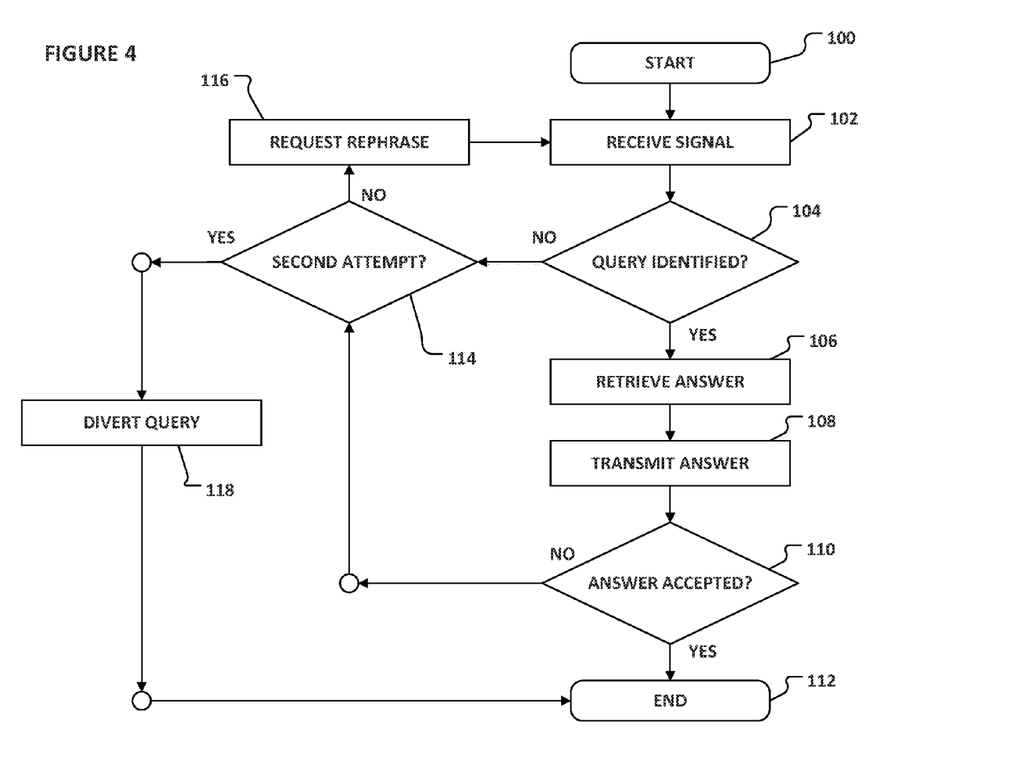
FIG. 4 is an example flow chart illustrating a method that can be carried out according to some embodiments of the present disclosure.

FIG. 4 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 4 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can receive a signal from a consumer transmitted through an augmented reality device worn by the consumer. At step 104, the commerce server can confirm that the signal contains a query from the consumer. If a query is identified, the process continues to step 106 and a proposed answer to the query is retrieved. At step 108, the proposed answer is transmitted to the consumer. At step 110, the commerce server can determine if the proposed answer is accepted by the consumer. If the answer is accepted, the process continues to step 112 and the exemplary process ends.

If a query is not identified at step 104 or if a proposed answer is not accepted at step 110, the process continues to step 114. Step 114 is a counter step. In the exemplary embodiment, a consumer can be prompted once to resubmit a signal to either identify a query or to retrieve an answer that is acceptable to the consumer. At exemplary step 114, the commerce server can confirm that the consumer has not been prompted more than once. If the consumer has not yet been prompted to submit another signal, the process continues to step 116 and the commerce server can send a signal to the consumer containing an audio or video request that the consumer submit another signal. The consumer can perceive a request to rephrase or restate the previous query through the augmented reality device worn by the consumer. After step 116, the exemplary method continues to step 102.

If the consumer has already been prompted to submit another signal, the process continues to step 118 from step 116 and the commerce server can divert the signal to human customer service. The human customer service can then assume control over answering the consumer's query and the process ends at step 112.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In some embodiments, the consumer can be compensated for the video recorded during shopping. For example, the consumer can be offered coupons or some percentage discount on products purchased during the recorded shopping. In some embodiments, the augmented reality device can be provided to the consumers; consumers can be provided coupons and discounts only available on the augmented reality devices provided by the retail store.

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A method of answering a query utilizing a system including an augmented reality device worn by a consumer and a commerce server having at least one processing device, the at least one processing device including a query module, a product database, a consumer status database, a retrieving module, a transmission module, a verification module and a diversion module, the method comprising:

receiving, by the query module, first and second signals from the augmented reality device, the first signal communicating audio data collected by a microphone of the augmented reality device, the second signal communicating image data collected by a camera of the augmented reality device;

identifying, by the query module, the presence of a query from the consumer within the first and/or second signals;

determining, using the consumer status database, the status of the consumer utilizing the system;

retrieving, by the retrieving module, a proposed answer to the query from the product database, the proposed answer being based at least in part on data within the first signal, the second signal, and/or the status of the consumer;

transmitting, by the transmission module, the proposed answer to the augmented reality device;

verifying, by the verification module, whether the proposed answer is accepted by the consumer;

receiving, by the query module, another first signal and/or another second signal from the consumer if the proposed answer is not accepted by the consumer;

responding, by the diversion module, to a predetermined number of unaccepted answers by the consumer by placing the consumer in real-time communication with a human provider of customer service; and generating, through the augmented reality device, a prompt using the audio data and the image data in order to initiate the real-time communication between the consumer and the human provider of customer service.

2. The method of claim 1 wherein the image data corresponds to a camera facing away from the customer.

3. The method of claim 1, wherein the image data corresponds to a camera facing toward the customer.

4. The method of claim 1, wherein the image data corresponds to images collected from at least two cameras of the augmented reality device.

5. The method of claim 4, further comprising using the image data to determine a distance from the consumer to an object viewed by at least two cameras.

6. The method of claim 1, wherein said transmitting step further comprises:

transmitting, by the transmission module, the proposed answer to the augmented reality device in audio format.

7. The method of claim 1, wherein said transmitting step further comprises:

transmitting, by the transmission module, the proposed answer to the augmented reality device in video format.

8. The method of claim 1, wherein said verifying step further comprises:

verifying, by the verification module, the proposed answer is not accepted by the consumer through an audio signal received from the augmented reality device.

9. The method of claim 3, the method further comprising:

determining, by the system including a position module, a consumer's position within a retail store and a direction the consumer is facing based on the data from the second signal; and transmitting, by the processing device, the at least one of the consumer's position within the retail store and the direction the consumer is facing to the human provider of customer service.

10. The method of claim 1 further comprising:

processing, by the augmented reality device, audio data generated by the consumer.

11. A consumer assistance system comprising:

a database configured to contain a product database and a customer status database, the customer status database configured to contain the status of a consumer utilizing the system;

a commerce server in communication with the database and having a processing device including:

a query module configured to identify the presence of a query within a first and a second signal received through an augmented reality device worn by the consumer and in communication with the commerce server, the first signal communicating audio data collected by a microphone of the augmented reality device, the second signal communicating image data collected by a camera of the augmented reality device;

a retrieving module configured to retrieve a proposed answer to the query from the product database, the proposed answer being based at least in part by data within the first signal, the second signal, and/or the status of the consumer;

a transmission module configured to transmit the proposed answer to the augmented reality device;

a verification module configured to determine whether the proposed answer is accepted by the consumer, wherein the query module is configured to receive another first signal and/or another second signal from the consumer if the proposed answer is not accepted by the consumer; and a diversion module configured to send the audio data and the image data to human customer service and place, via the augmented reality device, the consumer in real-time communication with a human customer service if the query module is unable to identify the query within the first and second signals, or if the verification module determines that the proposed answer is not accepted by the customer, wherein the augmented reality device is configured to generate a prompt using the audio data and the image data in order to initiate the real-time communication between the consumer and the human provider of customer service.

12. The consumer assistance system of claim 11 further comprising:

an electronic computing device configured to communicate with said diversion module and receive the audio data and the image data.

13. The consumer assistance system of claim 12 wherein said electronic computing device is operated by the human customer service.

14. The consumer assistance system of claim 13 wherein said electronic computing device is operable to communicate with said database.

15. The consumer assistance system of claim 14 wherein said database is further defined as a product database containing identities of products in a retail store and locations of each of the products within the retail store.

16. A non-transitory information recording medium on which a computer readable program is recorded that causes a system including an augmented reality device worn by a consumer and a commerce server having at least one processing device, the at least one processing device including a query module, a product database, a consumer status database, a retrieving module, a transmission module, a verification module and a diversion module, a method comprising:

receiving, by the query module, first and second signals from the augmented reality device, the first signal communicating audio data collected by a microphone of the augmented reality device, the second signal communicating image data collected by a camera of the augmented reality device;

identifying, by the query module, the presence of a query from the consumer within the first and/or second signals;

determining, using the consumer status database, the status of the consumer utilizing the system;

retrieving, by the retrieving module, a proposed answer to the query from the product database, the proposed answer being based at least in part on data within the first signal, the second signal, and/or the status of the consumer;

transmitting, by the transmission module, the proposed answer to the augmented reality device;

verifying, by the verification module, whether the proposed answer is not accepted by the consumer;

receiving, by the query module, another first signal and/or another second signal from the consumer if the proposed answer is not accepted by the consumer;

responding, by the diversion module, to a predetermined number of unaccepted answers by the consumer by placing the consumer in real-time communication with a human provider of customer service; and generating, through the augmented reality device, a prompt using the audio data and the image data in order to initiate the real-time communication between the consumer and the human provider of customer service.

* * * * *